INVENTOR
JAMES J. KELLUM

ATTORNEYS

INVENTOR
JAMES J. KELLUM

ATTORNEYS

United States Patent Office 3,344,061
Patented Sept. 26, 1967

3,344,061
ELECTROCHEMICAL METHOD AND APPARATUS FOR PRODUCING ACTIVATED GASES FOR THE TREATMENT OF SEWAGE
James J. Kellum, Jacksonville, Fla., assignor to Griffin Pollution Control Corporation, Jacksonville, Fla., a corporation of Florida
Filed Aug. 12, 1965, Ser. No. 484,160
14 Claims. (Cl. 210—15)

This application is a continuation-in-part of application Ser. No. 19,558 filed April 4, 1960, now abandoned.

This invention relates to a new method and apparatus for the deodorization and purification of materials. More particularly, this invention relates to a new method, apparatus and system for the purification and deodorization of industrial wastes, sewage and the like.

One of the major problems facing industry and urban development today is pollution of rivers, streams and the atmosphere from industrial wastes and sewage. Various ordinances and statutes have been enacted to prevent the dumping of raw sewage and industrial wastes into rivers and streams, killing fish and other wildlife, rendering the water unsuitable for domestic uses and destroying the beauty of natural waterways. Enormous amounts of money have been expended by industry and government in an effort to purify these wastes to the degree necessary to comply with the laws.

Large plants have been built in and around towns and cities for the purpose of sewage disposal at great expense to land values and the beauty of the surroundings; not to mention inescapable odors arising therefrom, the direction and strength of which are determined only by the prevailing winds.

Among the various solutions to the problem known in the art, are the bulk chemical treatment systems which require great quantities of varied chemicals, complicated and relatively expensive equipment, maintenance, storage and shipping difficulties. Often, where such chemical treatments have been tried, the chemicals themselves bring about pollution problems and undesired results. Further, such bulk chemical treatments, even though they may satisfactorily purify the liquid wastes, do little to rid the atmosphere of objectionable odors, and often augment same. A prechlorination treatment has often been used in sewage disposal plants, however, it is well known that the use of chlorine presents constant safety hazards to neighboring areas and to those persons daily handling chlorine.

In present day sewage control, the sewage is collected from domestic and industrial sources and fed into branch and trunk sewage lines which, in turn, lead into main lines carrying the flow to the treatment station. After treatment, the flow is discharged into rivers, streams and harbors and theoretically becomes part of the reusable water supply.

In the treatment stations, primary and secondary treatments are usually accomplished. In the primary step, physical separation of the settleable solids is accomplished by screening or sedimentation whereas the secondary treatment involves hastening nature's natural disposal phenomena in the combustion of organic solids. This latter treatment is generally effected by the use of aerobic bacteria in the presence of oxygen.

In recent years, with the production of more and more sewage containing higher concentrations of organic matter, longer detention times at the treatment stations have been required. These longer detention times, together with more complex and longer service lines, have resulted in serious odor and purification problems by reason that the organic matter in sewage begins the decomposition process before subjection to the anerobic bacteria can be initiated. Therefore serious and objectionable odor and purification problems constantly arise along the sewage network.

One of the objects of the present invention is to provide a novel method and apparatus for the simple and inexpensive treatment and control of sewage and elimination of its noxious odors.

A further object of the present invention is to provide a novel method and apparatus for sewage control to the end that present treatment plants will be able to handle greater quantities of sewage with resultant increased efficiency and reduced costs.

The method and apparatus of the present invention provides numerous advantages not heretofore known in the art of the disposal of sewage and waste. The present invention provides a method and apparatus whereby premature oxidation of the sewage and waste to the septic form is prevented by the provision of an atmosphere wherein the anerobic bacteria will flourish to the end that a part of the treatment operation is effected prior to entering the main treatment station.

Other advantages of the present invention reside in the method and apparatus whereby the corrosive action and odor of sulfur gases is eliminated which is detrimental to the sewage plant apparatus per se as well as the atmosphere. Moreover, the method and apparatus of the present invention provide a means whereby the dangerous formation of methane gas is substantially eliminated from sewage systems.

An unexpected advantage derived from the purifying media produced in our invention has been the prevention of rust and corrosion of the walls, machinery and other apparatus which heretofore has been a major problem in the moisture laden acid containing sewer gases.

In addition to the above hereinbefore set out advantages and theories, the process and apparatus of this invention makes possible with a relatively small, compact unit the continuous and uninterrupted treatment of tremendous volumes of gases, air and sewage heavily contaminated with odoriferous putrescible material far in excess of the limited air passage and the blower capacity of the generator apparatus itself.

In accordance with the present invention, a method is provided for the treatment of sewage which comprises activating air by the passage thereof through an electrical discharge grid pack to form an activated mixture of gases and then introducing said activated mixture into the sewage system.

In addition, an apparatus for carrying out the novel process is provided which comprises in combination; a housing having a plurality of communicating chambers arranged in sequence; the first chamber having an inlet for the air, means within the first chamber for drawing the air therein and impelling the air through the succeeding chambers; air heating means in the first chamber; electrical discharge means including aluminum metal electrodes forming a second chamber through which air impelled by the drawing-impelling means must flow; a step-up transformer operatively connected with a source of electric current and the air discharge means; the transformer means and drawing-impelling means arranged to cause the sequential operation thereof in that order at the beginning of each operation; and an outlet chamber for the receipt and discharge of the converted air into the sewage system.

An extension of the method and apparatus of this invention resides in the provision of a novel system for the control of waste and fumes associated with sewage treatment which comprises a sewage line network having a plurality of the novel means for activating air incorporated therein.

Other advantages and a clearer concept of the invention will become apparent by reference to the attached drawings wherein.

Figure 1:
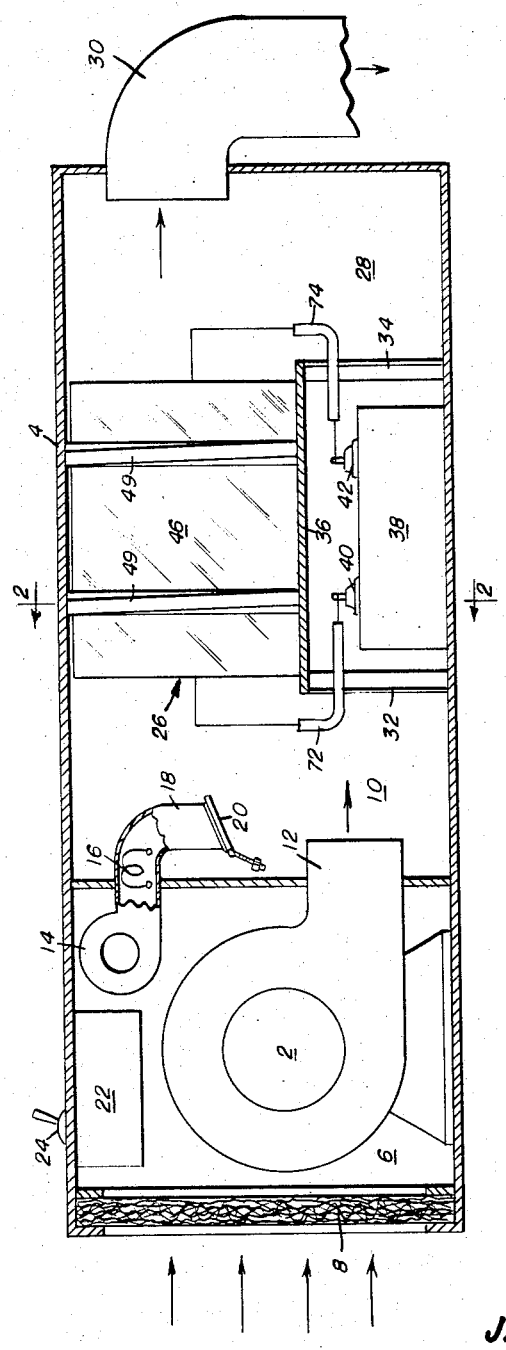
FIGURE 1 is a schematic diagram in section of the generating apparatus embodying the process and apparatus principles of this invention.

The broad concept of the process of my invention involves the introduction of a gas or mixture of gases, resulting from the activation of air, into the sewer system. The introduction of these activated gases into the sewage lines enables the sewage treatment operation to begin long before the flow reaches the treatment station. The presence of the activated gases appear to cause oxidation of the organic substances in the sewage prior to reaching the treatment area of existing sewage facilities and therefore greatly increases the quantity of sewage handled by present facilities.

In addition to causing oxidation of the organic sewage prior to reaching the treatment station, the activated gases also perform a number of separate functions which enhance the value of the process. The most important of these functions lies in the significant reduction in B.O.D. or biochemical oxygen demand. That is, the activated gases cause a reduction in the demand for oxygen by the sewage and thus prevent the rapid occurrence of a septic condition in the raw sewage.

Other important effects of the activated gases on the sewage are that there is an increase in dissolved oxygen, the humidity is decreased, solids are rapidly oxidized and noxious odors are eliminated, the latter benefit resulting in the ability of the activated gases to reduce the formation of sulfides substantially to zero. Moreover, the formation of dangerous methane gas is substantially prevented.

The exact constitution of the activated gases produced in the process of this invention is not, of course, capable of precise evaluation. However, a theory has been advanced that the tremendous quantities of purifying and deodorizing gas produced in the process is a mixture of nitrogen oxides. The purifying and deodorizing gases produced give a negative reaction in the well known, so-called ortholidine test for ozone. If any ozone were produced in the process, it would react with the lower nitrogen oxides to form higher oxides such as nitrogen pentoxide. This theory is confirmed by the odor of the gas produced which is sweet and pungent, similar to, but distinctly unlike, the unmistakable odor of ozone. Analysis of the activated gas indicates that the mixture contains at most, minute traces of ozone. Hence, the gases produced by the process and apparatus of this invention are not of the type produced by conventional ozone generating apparatus.

It has further been theorized that the unexpected rust and corrosion inhibiting and drying properties of the gases produced is a result of the anhydrous mixture of the nitrogen-oxides which grab, so to speak, moisture from the surrounding atmosphere, thereby preventing the formation of slime, rust and corrosion on the walls of sewer lines and treatment plants. In other words, the corona discharge to which the gases are subjected disrupts the nitrogen molecules and the nitrogen atoms then combine with the atoms of oxygen simultaneously present, thus fixing the nitrogen as various nitrogen oxides including $NO$, $NO_2$, $N_2O_4$, $N_2O_3$ and $N_2O_5$. These nitrogen compounds then react with oxygen and water present in the atmosphere to eventually produce the active gases.

This rationalization as to the gases and reactions present agrees with known theories advanced relative to the disposal of sewage by biological processes. This process introduces fixed nitrogen to liquid sewage by absorption and dissolution of gaseous acid anhydrides and mists to provide a necessary nutrient or environment for the microbes responsible for digestion of sewage. The nitrogen oxides produced oxidize the sulfides either as a gas or in water solution to relatively odorless compounds.

The process concepts and apparatus therefor which comprise this invention may be more clearly understood by detailed reference to the drawings accompanying this application.

Referring to FIGURE 1, there is shown in section the generating apparatus of this invention which comprises a housing 4 containing a plurality of chambers. The chambers comprise generally an inlet chamber 10, an activating chamber 46 and an outlet chamber 28.

The process utilizing the apparatus comprises introducing air into the first chamber and heating to the desired temperature. Then the heated air is impelled into the second chamber where the activation thereof takes place. Thereafter, the activated air is discharged from the outlet chamber into the sewage system.

Figure 2:
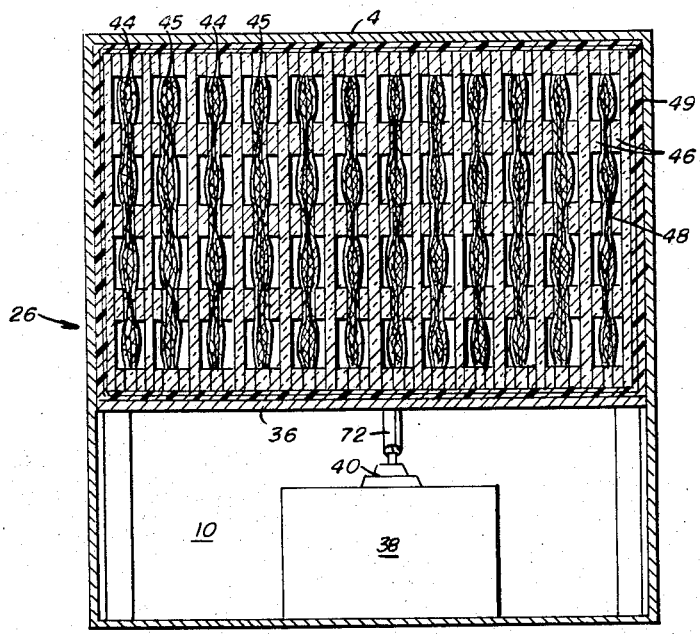
FIGURE 2 shows a cross-sectional view through plane 2—2 of the air activating assembly of FIGURE 1.

Referring to FIGURES 1 and 2 in detail, there is shown an induction motor driven blower 2 which causes a reduction in pressure on the inlet or suction side at the left of housing 4 and air from the atmosphere is thereby drawn into first chamber 6 of the housing 4 through filter means 8 and driven into chamber 10 through discharge pipe 12 of blower 2. Blower 2 may be any induction motor driven, high volume blower, having, for example, a capacity of 500 cubic feet per minute. Filtering means 8 may be of any conventional type, such as glass wool loosely compacted, to remove dirt or other heavier contaminants from the gases entering the apparatus. Preceding any starting operation of blower 2 in chamber 6, induction motor driven blower 14, which contains a low-heating element 16 in its discharge pipe, is energized. Blower 14 may be any induction motor driven blower having a Calrod type heating element in the outlet thereof. The capacity of this blower may be of the same capacity or smaller than that of blower 2; for example, when blower 2 has a capacity of 500 cubic feet per minute the capacity of blower 14 may be of the order of 30 cubic feet per minute. Atmospheric air, heated by heater 16, is delivered by blower 14 through check damper 20 into chamber 10 and thence through the electrode assembly of air activator-generator 26. One of the purposes of chamber 10 is to prevent any backflow of either the unheated or heated air impelled through the apparatus.

Blower 14 is caused to operate for a predetermined interval by a sequence controller 22 connected to any suitable source of electrical current (not shown) and controlled by switch 24. Check damper 20 prevents any back-flow of air into blower 14 when blower 2 is in operation.

After the electrodes have been cleaned and dried by heated air from blower 14, blower 14 and heating element 16 cease to operate and substantially simultaneously with this cessation of operation, transformer 38 is caused to energize activator assembly 26. Subsequent to the energizing of generator 26, blower 2 is caused to drive atmospheric air through the generator wherein the air is converted or activated to develop purifying and deodorizing properties. The generator is energized for a predetermined interval prior to the operation of blower 2 in order that the variations of temperature of the impelled gases of the blowing cycles do not cause fracturing of the dielectric assembly.

The activated gases are driven out of the gas-generator 26 into outlet chamber 28. From chamber 28 these gases are impelled through discharge pipe 30 to the place of use.

The generator according to the present invention operates on the electric discharge principle by which mixtures of gases may be converted into the activated form by the passage therethrough of an electric discharge. The gas to be activated passes from pressure chamber 10 through the generator 26, then to outlet chamber 28. Partitions 32 and 34 form supports for platform 36 on which the activator assembly is mounted. Partitions 32 and 34, platform 36 and the top portion of housing 4 thus form a passageway in which activator assembly 26 is mounted. In this manner all gases impelled through chamber 10 to outlet chamber 28 must pass through the activator. Partitions 32 and 34, platform 36 and the floor of housing 4 form a substantially sealed chamber in which high voltage transformer 38 is mounted. Transformer 38 provides a voltage of the order of 15,000 volts at the secondary terminals 40 and 42, partitions 32 and 34, respectively, to alternate electrodes 44 and 45 respectively in activator 26 in such manner that contiguous electrodes are of opposite polarity.

The activator assembly unit 26 as seen in a cross-sectional view in FIGURE 2, is in the form of a grid pack which comprises a plurality of nonferrous metallic electrodes 44 and 45, dielectric plates 48 and spacers 46. This grid pack assembly is bound firmly into a compact unit by encircling insulating straps 49 and mounted on platform 36 as discussed hereinbefore.

As shown in detail in FIGURE 2, the nonferrous metallic electrodes 44 and 45 are positioned in vertically stacked relationship and separated by dielectric plates 48 formed of any suitable dielectric material such as high dielectric glass or other low leakage insulated material. The dielectric plates are separated by spacers 46 preferably of the same dielectric material as the plates. Electrodes 44 and 45 are positioned in each space formed by dielectric plates 48 and spacers 46. The electrodes are connected through insulated wires 72 and 74 with secondary terminals 40 and 42 respectively, of transformer 38. The metallic wool electrodes of this invention are comprised of aluminum metal. It has been discovered that electrodes of coarsely woven or laminates of expanded aluminum metal offer advantages heretofore undiscovered. It has further been found that such electrodes are impervious to the corrosion caused by salt laden atmospheric air and resistant to electrical discharge pitting. The electrodes substantially fill the spaces provided as described hereinbefore, providing thereby a maximum surface for electrical discharge, yet providing maximum ventilation for large quantities of air to be passed therethrough and around, resulting in the maximum production of the activated gases.

It is to be noted that the outlet chamber 28 of the apparatus serves to prevent the immediate discharge of the gases after activation. Hence the chamber provides a means for the relatively slow dispersion into the sewer system. This function of the outlet chamber acts to clearly distinguish the apparatus from the well known ozone generators as such generators require immediate discharge of the ozone into the atmosphere because of the very unstable nature of ozone. Hence, the outlet chamber serves a very definite purpose in the apparatus of this invention.

Figure 3:
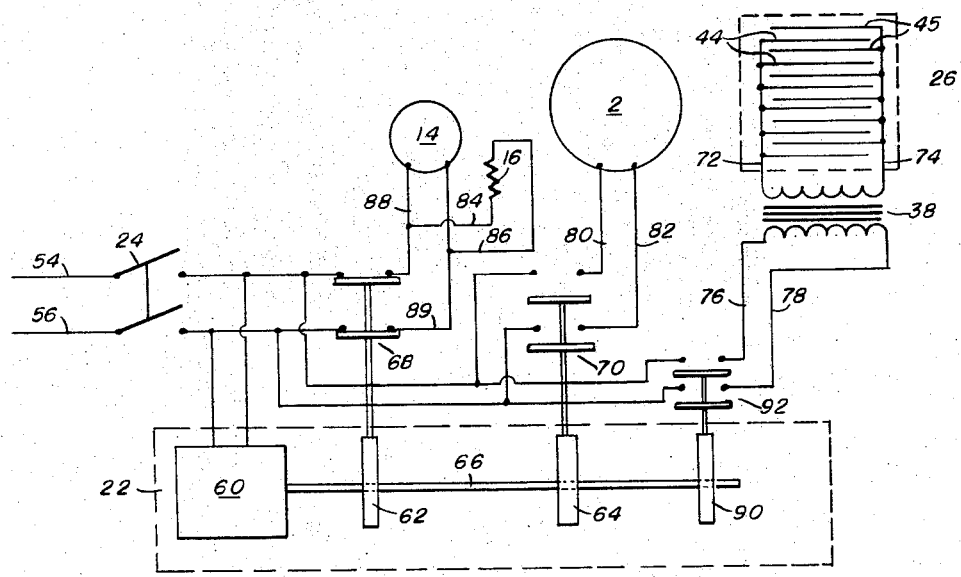
FIGURE 3 illustrates a wiring diagram of the apparatus of this invention.

A wiring diagram of the circuit of the apparatus of this invention is shown in FIGURE 3. Sequence controller 22 is connected through leads 54 and 56 to a suitable source of power through double dipole switch 24. The sequence controller may be any suitable type by means of which blower 2, activator 26 and blower 14 with heating unit 16 may be caused to operate sequentially. For illustrative purposes, sequence controller 22 is shown to consist of timer 60 and eccentric cams 62, 64 and 90 operating on cam shaft 66. Cams 62, 64 and 90 operate sequentially at predetermined intervals to close double dipole switches 68, 70 and 92 respectively, with respect to the source of power through switch 24. Electrodes 44 and 45 are connected alternately through conductors 72 and 74, respectively, to the secondary of transformer 38. Transformer 38 is connected to conductors 76 and 78 which are connected to the power source through switch 92 in such manner that the transformer is energized substantially simultaneously with the deenergizing of blower 14 and heating element 16. Heating element 16 is connected by conductors 84 and 86 to conductors 88 and 89 which conductors connect blower 14 with the power source, through switch 68.

In operation, power line wires 54 and 56 are connected through switch 24 to timer 60. Timer 60 operates cam 62 through shaft 66 and causes switch 68 to energize blower 14 and its heating element 16. Blower 14 impels the thusly heated air from the atmosphere through generating assembly 26. The main purpose of this heated air is to clean and dry generator 26 in order that the most efficient surface for electrical discharge may be provided and further obviating the constant maintenance problems. Upon any interruption of the sequence of operation of the apparatus, for example power interruption, the complete cycle of operation is caused to begin again by operation of timer 60. This drying operation continues as long as necessary, dependent on the amount of moisture or other contaminants present on the electrodes. When this drying operation is finished switch 68 is opened substantially simultaneously with the closing of switch 92 which energies transformer 38. Transformer 38 now supplies high voltage to the electrodes 44 and 45. After energizing transformer 38, blower 2 is energized to impel air through the apparatus by the closing of switch 70 by cam 64. Due to the stacked arrangement of the oppositely charged, metallic wool or laminated electrodes of this invention with the attendant enormous electrode surface, a great plurality of discharges are produced causing the activation of gases impelled through the electrodes. This construction of the electrodes makes possible the activation of substantially all of the gases to a state wherein the gas individually or in a compounded or complex form exhibits deodorizing and purifying properties. These activated gases are then forced out of the generator into outlet chamber 28, and thence to place of use.

In the illustrated embodiment of FIGURE 1 the blowing-heating means 14 and 16 are shown as separate means from the impelling means 2. The invention is not limited to such structure for the reason that instead of providing heated air for drying by use of blower 14 and its heater 16, a heater could be made to cooperate with blower 2 for heating the air from the blower 2 for the desired purpose. However, the separate heater arrangement of FIGURE 1 is preferred for the reason that blower 14 and heater 16 are operative only at the beginning of any operation such as when first placing the apparatus into operation or after operation has been interrupted by power failure or other cause.

In use, the apparatus illustrated in FIGURE 1 is attached to the sewage lines at a point far removed from the treating station. The apparatus, when started, then begins its sequential operation and proceeds to introduce large quantities of activated gases into the sewage lines with the advantageous results delineated hereinabove.

It is contemplated that several of the machines, rather than a single unit, may be installed at necessary points along a sewage line. The number of units required would, of course, depend on the needs of the existing sewage facilities.

It is obvious that the apparatus of the invention may be modified without departing from the inventive concept disclosed herein. Thus it will be obvious that the air activating assembly unit may be made with more or fewer electrodes and less or more densely arranged electrodes and that the thickness of the dielectric plates and spacers may be varied, depending upon the voltage employed.

It is therefore obvious that these and other modifications of the present process and apparatus can be resorted to without departing from the spirit and scope of the invention. Accordingly, only such limitations should be imposed as are specifically set forth in the appended claims.

What is claimed is:

1. A method for the treatment of sewage which comprises passing atmospheric air through an electrical discharge grid pack whereby said air forms activated gases, destroying substantially any ozone present in said gases, and then introducing said activated gases into the sewer system.

2. A method for the treatment of sewage which comprises passing atmospheric air through an electrical discharge grid pack comprising electrodes of expanded aluminum to form activated gases, destroying substantially any ozone present in said gases and then introducing said activated gases into the sewer system.

3. A method for the treatment of sewage which comprises: filtering atmospheric air, impelling said heated air through an electrical grid pack comprising electrodes of expanded aluminum whereby said air is converted to a mixture of activated gases, destroying substantially any ozone present in said gases and introducing said activated gases into the sewer system.

4. A method for the treatment of sewage which comprises passing filtered atmospheric air through an electrical discharge grid pack comprising electrodes of expanded aluminum to form an activated mixture of nitrogen oxides, substantially destroying any ozone present and then introducing said activated mixture into the sewer system.

5. A method for the reduction in B.O.D. (biochemical oxygen demand), decrease in humidity, oxidation of solids and elimination of odors in raw sewage comprising; passing atmospheric air through a filter, impelling said filtered air through an electrical discharge grid pack comprising electrodes of expanded aluminum whereby said air is activated to form a mixture of nitrogen oxides, and discharging the activated nitrogen oxides mixture into the sewer system.

6. An apparatus for producing a mixture of gases from atmospheric air, comprising in combination; a housing having a plurality of communicating chambers arranged in sequence; the first chamber having an inlet for the air to be activated; means within said first chamber for drawing the air into the first chamber and impelling such air through the succeeding chambers; heating means in said first chamber; electrical discharge means comprising aluminum metal electrodes forming a second chamber through which air impelled by said drawing-impelling means must flow; a step-up transformer operatively connected with a source of electric current and said air electrical discharge means; a sequence controller means operatively connected with said heating means, said transformer means and said drawing-impelling means to cause the sequential operation thereof in that order at the beginning of each operation; and an outlet chamber for the receipt and discharge of the converted air.

7. The apparatus of claim 6 wherein the electrical discharge means comprises in combination, a plurality of dielectric plates and non-conducting spacers therefor, electrodes of laminated sheets of expanded aluminum metal arranged between the dielectric plates, said electrodes being connected in an alternate manner to alternate poles of said transformer.

8. The apparatus of claim 6 wherein the electrical discharge means comprise in combination a plurality of dielectric plates and non-conducting spacers therefor, electrodes of coarsely woven metallic aluminum wool arranged between the dielectric plates, said electrodes being connected in an alternate manner to alternate poles of said transformer.

9. An apparatus for producing predominantly a mixture of oxides of nitrogen from atmospheric air, comprising in combination a housing having a plurality of connecting chambers arranged in sequence, the first chamber having an inlet for the gas to be activated; means within said first chamber for drawing the gas into said first chamber and impelling this gas through the succeeding chambers; separate means in said first chamber for heating air from the atmosphere and impelling the air so heated through the succeeding chambers; electrical discharge means comprising electrodes of laminated expanded aluminum metal positioned within the second chamber and succeeding chambers through which all gases are impelled; means within said second chamber to prevent backflow of gases impelled from the first chamber; a step-up transformer operatively connected with a suitable source of electric current and electrical discharge means to produce a corona discharge; sequence controller means connected with said transformer-activating means, said drawing-impelling means and said separate drawing-impelling-heating means to cause the sequential operation thereof in that order at the beginning of each operation; and a third chamber having an outlet provided for the egress of the mixture of nitrogen oxides produced.

10. The apparatus of claim 9 wherein the activating means comprises in combination a plurality of dielectric plates and non-conductive spacers therefor, electrodes of aluminum metal, vertically arranged between the dielectric plates, said electrodes being connected in an alternate manner to alternate poles of said transformer in such manner to produce a corona discharge.

11. The apparatus of claim 10 wherein said aluminum metal electrodes are coarsely woven metallic aluminum wool.

12. The apparatus of claim 11 wherein said aluminum metal electrodes are laminates of expanded aluminum metal.

13. A generator assembly for producing oxides of nitrogen from atmospheric air comprising in combination, a step-up transformer, a generating assembly unit comprising a stack of vertically positioned electrodes; each electrode comprising compacted metallic aluminum wool; dielectric plates and spacers interposed between each two adjacent electrodes; conductors for connecting alternate electrodes to a terminal of the transformer; conductors for connecting the remaining electrodes to the other terminal of the transformer; and tape means for banding the stacked electrode assembly into a compact unit.

14. A purifying and deodorizing gas generator assembly comprising in combination an electric step-up transformer, a generating assembly unit comprising a stack of vertically positioned electrodes, each electrode comprising laminates of expanded aluminum metal, dielectric plates and spacers interposed between each two adjacent electrodes, conductors for connecting alternate electrodes to a terminal of the transformer, conductors for connecting the remaining electrodes to the other terminal of the transformer and tape means for banding the stacked electrode assembly into a compact unit.

References Cited

UNITED STATES PATENTS

| 1,458,525 | 6/1923 | Daniels et al. | 204—312 |
| 2,561,014 | 7/1951 | Daily | 204—322 |
| 2,744,865 | 5/1956 | Penning | 204—322 |

FOREIGN PATENTS

| 24,945 | 3/1910 | Great Britain. |
| 257,694 | 9/1926 | Great Britain. |
| 684,064 | 12/1952 | Great Britain. |

HOWARD S. WILLIAMS, *Primary Examiner.*